United States Patent [19]
Levenstein et al.

[11] Patent Number: 5,812,521
[45] Date of Patent: Sep. 22, 1998

[54] STATIC ADDER USING BICMOS EMITTER DOT CIRCUITS

[75] Inventors: Sheldon Bernard Levenstein; Nghia Van Phan, both of Rochester, Minn.

[73] Assignee: International Business Machines Corporation, Armonk, N.Y.

[21] Appl. No.: 674,098

[22] Filed: Jul. 1, 1996

[51] Int. Cl.[6] .................................................... G06F 7/50
[52] U.S. Cl. ................................ 364/784.02; 364/787.01
[58] Field of Search ...................................... 364/768, 784, 364/786, 787, 788, 716

[56] References Cited

U.S. PATENT DOCUMENTS

| | | | |
|---|---|---|---|
| 4,215,402 | 7/1980 | Mitchell et al. | 395/421.06 |
| 4,704,679 | 11/1987 | Hassler et al. | 395/421.1 |
| 5,163,020 | 11/1992 | Chau | 364/788 |
| 5,197,140 | 3/1993 | Balmer | 395/421.1 |
| 5,235,539 | 8/1993 | Patel | 364/787 |
| 5,272,662 | 12/1993 | Scriber et al. | 364/788 |
| 5,355,030 | 10/1994 | Buchholtz et al. | 326/110 |
| 5,379,393 | 1/1995 | Yang | 395/403 |
| 5,428,302 | 6/1995 | Nakase | 326/17 |
| 5,479,356 | 12/1995 | Shackleford et al. | 364/787 X |

OTHER PUBLICATIONS

A. G. Aipperspach et al., "High Performance BICMOS Compare", Feb. 1984, IBM Technical Disclosure Bulletin, vol. 37, No. 02B, pp. 543–544.

*Primary Examiner*—Chuong Dinh Ngo
*Attorney, Agent, or Firm*—Steven R. Funk; Merchant, Gould, Smith, Edell, Welter & Schmidt

[57] ABSTRACT

A parallel static adder for adding two n-bit operands, the adder including half-sum circuitry, summing circuitry, and carry look-ahead circuitry. The half-sum circuitry receives a pair of same-order bits from the two n-bit operands, and generates a plurality of half-sum signals for each of the pairs of same-order bits. The summing circuit adds a corresponding half-sum signal to a carry signal from a preceding lower order summing circuit. The carry look-ahead circuit generates a carry signal for higher order summing circuits. Each of the carry look-ahead circuits includes a plurality of logic arrays, each comprising one or more field effect devices coupled in parallel between a first node and a second node, where each of the field effect devices has a gate input to receive lower order addend and augend bits in accordance with a predetermined carry look-ahead equation. The carry look-ahead logic further includes a plurality of bipolar devices, coupled in parallel between a supply voltage and an output node, where each has a base terminal coupled to one of the first nodes of the plurality of field effect devices to provide a sum term of the predetermined sum-of-products at the output node.

18 Claims, 12 Drawing Sheets

STATIC ADDER USING BICMOS EMITTER DOT CIRCUITS

FIELD OF THE INVENTION

The present invention relates generally to static adders implementing carry lookahead logic. More particularly, the present invention relates to a full static adder implementing bipolar complimentary metal oxide semiconductor (BICMOS) circuitry for increasing carry speeds.

BACKGROUND OF THE INVENTION

Binary addition plays an important role in modern day computing systems. Parallel and serial adders are used for a wide variety of purposes in processing systems. Even rudimentary microprocessor chips include adders, incrementors, and comparators, all of which employ binary addition. Addition is also constantly performed on processor addresses due to incremental changes to the program counter and other address offsets. These addition functions are often on a critical path of the system, thereby directly affecting overall system speed. Therefore, the speed in which an adder can perform an addition function is of utmost importance in maintaining high system speeds.

Ripple adders have commonly been used to perform simple parallel addition functions. The ripple adder is a cascade of n full-adder stages, each of which handles one bit. The carry output of each full adder is connected to the carry input of the next most significant full adder. However, a ripple adder is slow, since in the worse case a carry must propagate from the least significant full adder stage to the most significant one. Therefore, the beneficial simplicity of the ripple adder is overcome by the intolerable carry delays.

A faster adder can be built by obtaining each sum output with just two levels of logic. This can be accomplished by writing an equation for a sum in terms of all previous inputs and the first carry-in bit, and multiplying out to obtain a sum-of-products or product-of-sum expression, and building the corresponding AND-OR or OR-AND circuit. Unfortunately, as the number of bits being added increases, the resulting expressions have an unmanageable number of terms, requiring too many first-level gates and more inputs than typically possible on the second-level gate. In order to overcome this unmanageable problem, adders have been built with greater than two levels of delay using a more reasonable number of gates through the use of carry lookahead adders. Carry lookahead adders provide a compromise between the number of gates used, and the carry ripple that will be tolerated.

Adders have been constructed from metal-oxide semiconductor (MOS) families, but there are disadvantages to some MOS adders, including higher capacitances and lower speeds. A very large scale integration (VLSI) circuit of high performance having the advantages of both bipolar and MOS technologies may be realized by forming a bipolar transistor and a MOS transistor over a common semiconductor substrate and by placing these transistors in a circuit to form a so-called bipolar complimentary metal oxide semiconductor (BICMOS). A BICMOS logic switching circuit may include two different stages. The first stage includes CMOS field effect transistors (FETs) to achieve the desired logic function, while the second stage includes at least one bipolar transistor to operate as the driving stage of the logic switching circuit.

Bipolar transistors provide higher currents than FETs under identical operating conditions. Additionally, bipolar transistors require less space and exhibit lower input capacitance than FETs. On the other hand, FETs are preferably utilized in the first stage of a BICMOS logic switching circuits to perform the desired logic function, since FETs have superior integration density when low levels of power dissipation are required in the circuit. Moreover, FETs also provide better logic efficiency than the bipolar transistors.

It is therefore desirable to increase the speed of a parallel full adder. The present invention utilizes a novel BICMOS circuit design to construct carry lookahead logic in a parallel adder. Capacitance is decreased, and speed is increased by the use of the present invention. The present invention therefore provides a solution to these and other problems, and offers other advantages over the prior art.

SUMMARY OF THE INVENTION

The present invention relates to a full static adder implementing bipolar complimentary metal oxide semiconductor (BICMOS) circuitry for increasing carry speeds.

In accordance with one embodiment of the invention, a carry look-ahead circuit for use in generating carry bits in an n-bit parallel static adder is disclosed. The parallel adder is coupled to an addend register and an augend register to generate sums of like-order addend and augend bits, and also adds the lower order carry bit from a preceding adder stage. The carry look-ahead circuit includes a plurality of logic arrays, where each logic array includes field effect devices coupled in parallel between first and second nodes. Each of the field effect devices has a gate input to receive lower order addend and augend bits in accordance with a predetermined carry look-ahead equation. The carry look-ahead circuit further includes a plurality of bipolar devices, coupled in parallel between a supply voltage and an output node. The emitter terminals of each bipolar device are coupled together in an emitter-dot configuration at the output node. Each bipolar device has a base terminal coupled to one of the logic arrays, which includes the field effect devices, at the first node of that logic array. The bipolar devices provide gain for the signal at the first node, and generates a signal at the output node.

In accordance with another embodiment of the invention, a parallel static adder for adding two n-bit operands is disclosed. The adder includes half-sum circuitry, summing circuitry, and carry look-ahead circuitry. The half-sum circuitry receives a pair of same-order bits from the two n-bit operands, and generates a plurality of half-sum signals for each of the pairs of same-order bits. The summing circuitry is coupled to the half-sum circuit to receive a corresponding one of the half-sum signals, and to add the corresponding half-sum signal to a carry signal from a preceding lower order summing circuit. The carry look-ahead circuits are each coupled to a different one of the summing circuits to generate the carry signal for a succeeding higher order summing circuit. Each of the carry look-ahead circuits includes a plurality of logic arrays, where each logic array includes field effect devices coupled in parallel between first and second nodes. Each of the field effect devices has a gate input to receive lower order addend and augend bits in accordance with a predetermined carry look-ahead equation. The carry look-ahead circuit further includes a plurality of bipolar devices, coupled in parallel between a supply voltage and an output node. The emitter terminals of each bipolar device are coupled together in an emitter-dot configuration at the output node. Each bipolar device has a base terminal coupled to one of the logic arrays, which includes the field effect devices, at the first node of that logic array. The bipolar devices provide gain for the signal at the first node, and generates a signal at the output node.

These and other features and advantages of the present invention will become readily apparent to those skilled in the art from the following detailed description and corresponding drawings. As will be realized, the invention is capable of modification without departing from the invention. Accordingly, the drawing and description are to be regarded as illustrative in nature, and not as restrictive.

BRIEF DESCRIPTION OF THE DRAWINGS

FIG. 11, including

DETAILED DESCRIPTION OF THE PREFERRED EMBODIMENTS

Figure 1:
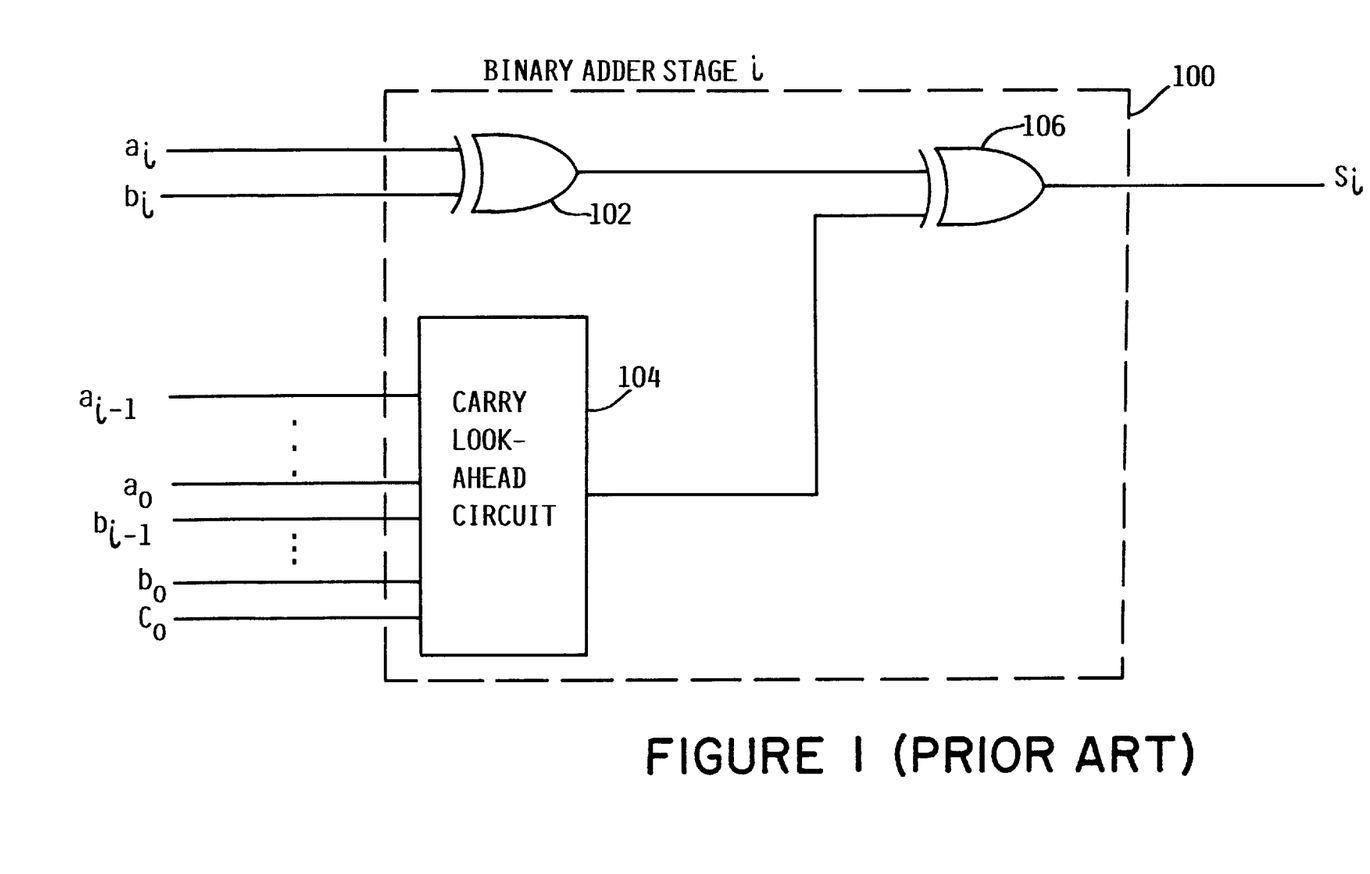
FIG. 1 is a diagram of one stage of a prior art carry look-ahead adder.

FIG. 1 is a diagram of one stage of a prior art carry look-ahead adder. In order to properly understand the binary adder of the present invention, an understanding of parallel addition of digital data using carry look-ahead adders is required. FIG. 1 shows typical circuitry of stage i 100 of a full binary adder. The binary adder stage i 100 includes an exclusive-or gate 102 receiving augend $a_i$ and addend $b_i$, and a carry look-ahead circuit 104 receiving augends $a_0$–$a_{i-1}$, addends $b_0$–$b_{i-1}$ and carry bit $c_0$. The outputs of exclusive-or 102 and carry look-ahead circuit 104 are inputted into exclusive-or 106. The sum $s_i$ of the binary adder stage i 100 having augend $a_i$, addend $b_i$, and carry-in $c_i$ can be represented by:

$$s_i = a_i \oplus b_i \oplus c_i \qquad \text{[Equation 1]}$$

In order to reduce carry delays associated with a ripple adder, $c_i$ of Equation 1 can be expanded in terms of $a_0$–$a_{i-1}$, $b_0$–$b_{i-1}$, and $c_0$ to design the $c_i$ logic into multiple levels of logic. For a particular combination of inputs $a_i$ and $b_i$, adder stage i is said to "generate" a carry if it produces an active carry-out (e.g., $c_{i+1}=1$) independent of the inputs on $a_0$–$a_{i-1}$, $b_0$–$b_{i-1}$, and $c_0$. Adder stage i is said to "transmit" carries if it produces an active carry-out (e.g., $c_{i+1}=1$), while in the presence of an input combination of $a_0$–$a_{i-1}$, $b_0$–$b_{i-1}$, and $c_0$ that produces an active carry-in (e.g., $c_i=1$). A carry-generate signal $g_i$, and a carry-transmit signal $t_i$, can then be written in terms of augend $a_i$ and addend $b_i$ for each stage of a carry look-ahead adder as follows:

$$g_i = a_i \cdot b_i; \qquad \text{[Equation 2]};$$

$$t_i = a_i + b_i \qquad \text{[Equation 3]}$$

A particular stage i represented by binary adder stage i 100 therefore "generates" a carry if $a_i$ and $b_i$ are both set to a binary 1, and "transmits" a carry if at least one of $a_i$ and $b_i$ are set to a binary 1. The carry-out of a particular stage i can then be written as:

$$c_{i+1} = g_i + (t_i \cdot c_i) \qquad \text{[Equation 4]}$$

The carry look-ahead adder utilizes Equation 4 by expanding the $c_i$ term for each stage i to obtain carry equations for $c_{i+1}$ in terms of $g_0$–$g_i$, $t_0$–$t_i$, and $c_0$. A sum-of-products (or a product-of-sums if DeMorgan's equivalent is applied) results therefrom which can determine a carry-in bit at a particular stage i more quickly than carries that propagate through a ripple adder. Therefore, the use of such carry look-ahead adders reduces the delays associated with ripple adders that must propagate a carry from the least significant adder stage to the most significant adder stage.

The present invention utilizes a novel mixture of circuit family technologies and binary adding techniques (including carry look-ahead techniques) to generate a high speed static adder via a low input capacitance carry look-ahead and sum circuit.

Figure 2:
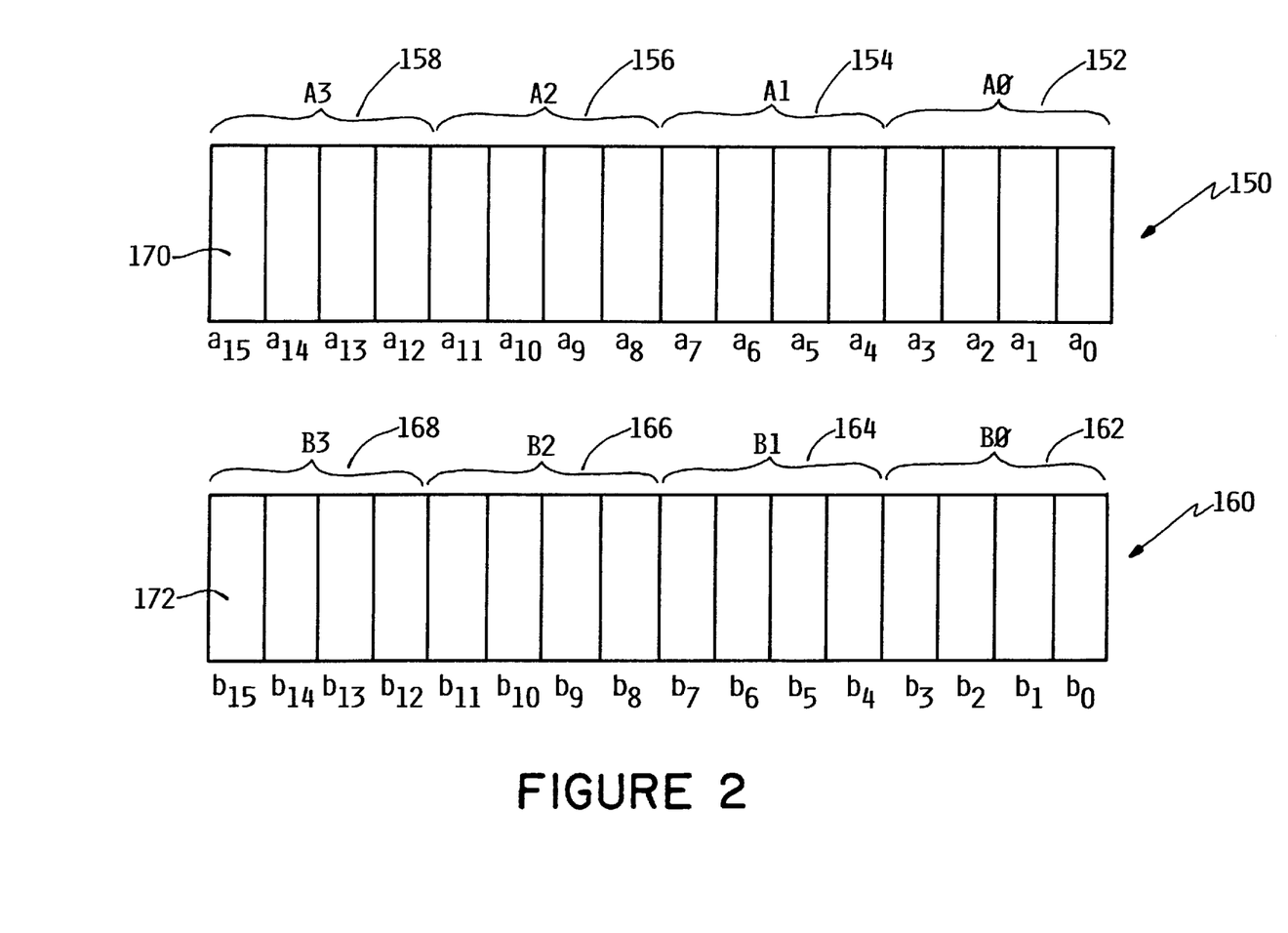
FIG. 2 illustrates the format of two 16-bit operands which can be added utilizing the present invention.

FIG. 2 illustrates the format of two 16-bit operands which can be added utilizing the present invention. Operand 150 has 16 bits labeled $a_0$–$a_{15}$, and operand 160 has 16 bits labeled $b_0$–$b_{15}$. Bits $a_0$ and $b_0$ represent the least significant bits, and bits $a_{15}$ and $b_{15}$ represent the most significant bits of operands 150 and 160 respectively. Operand 150 consists of four 4-bit nibbles labeled nibble A0 152, A1 154, A2 156 and A3 158. Similarly, operand 160 consists of nibbles B0 162, B1 164, B2 166 and B3 168. Bits of the same order are added in order to generate a 16-bit sum. For instance, addend $a_{15}$ 170 and augend $b_{15}$ 172 are added to produce a sum bit $s_{15}$ representing the sum of the i=15 bits of operands 150 and 160.

Figure 3:
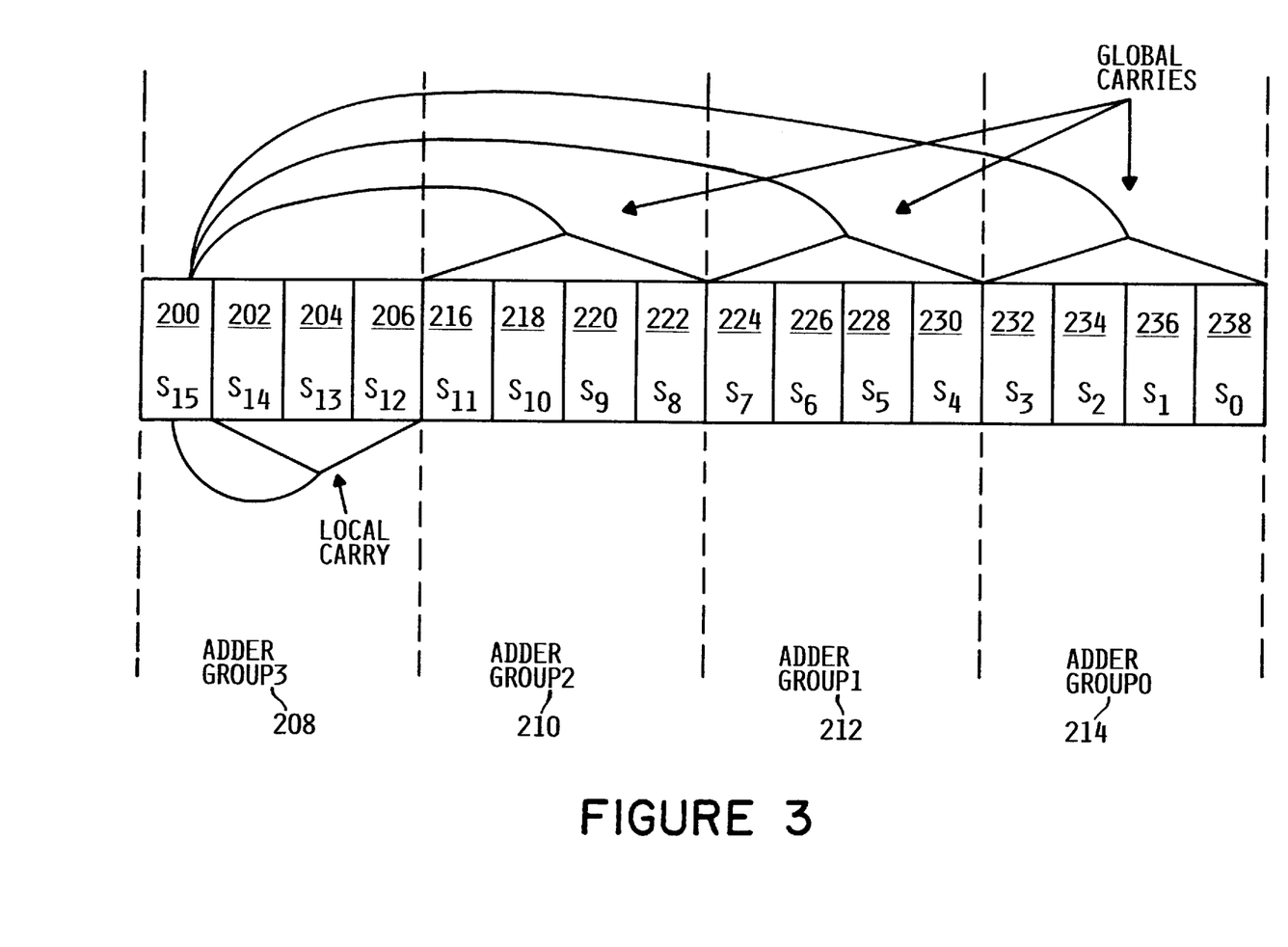
FIG. 3 illustrates the carry methodology of the preferred embodiment for a 16-bit adder.

FIG. 3 illustrates the carry methodology of the preferred embodiment for a 16-bit adder. A 16-bit adder is shown for illustrative purposes only, as the principles described herein are equally applicable to adders of different bit sizes. Referring first to the most significant adder stage 200 which generates sum bit $s_{15}$, a carry bit can be ascertained by calculating a local carry look-ahead from adder stages 202, 204 and 206 within adder group3 208, and by calculating a global carry look-ahead for the lower order adder stages. These lower order adder stages calculate the global carry look-ahead for sum bits $s_0$–$s_{11}$ on a nibble basis represented by adder group2 210, adder group1 212 and adder group0 214. A global carry look-ahead therefore generates carries across nibble, or adder group, boundaries. Adder group2 210 includes adder stages 216, 218, 220 and 222 for generating sum bits $S_{11}$, $S_{10}$, $S_9$ and $S_8$ respectively. Similarly, adder group1 212 includes adder stages 224, 226, 228 and 230 for generating sum bits $S_7$, $S_6$, $S_5$ and $S_4$ respectively, and adder group0 214 includes adder stages 232, 234, 236 and 238 for generating sum bits $S_3$, $S_2$, $S_1$ and $S_0$ respectively. The global carry look-ahead methodology holds true when calculating the carry for lower order bits as well. For instance, adder stage 228 which generates sum bit $s_5$ receives a local carry from adder stage 230, and receives a global carry from the adder stages in adder group0 214.

Local carries as well as global carries are implemented in the carry look-ahead logic of the present invention. The use of both local and global carry look-ahead logic provides a compromise between the delays associated with a pure ripple adder and the number of logic gates required in a pure carry look-ahead adder. Delays are reduced by using carry look-ahead techniques within adder group0 214, adder group1 212, adder group2 210 and adder group3 208. Where a sum is being generated for sum bit $s_{10}$, for instance, a global carry look-ahead is generated for adder group0 214, another global carry look-ahead is generated for adder group1 212, and a local carry look-ahead is generated for adder stages 220 and 222. A reduction in logic gates is realized by generating these separate carry look-ahead in groups rather than implementing a single comprehensive carry look-ahead generator. Another level of carry look-ahead logic then combines the local and global carry look-ahead results from the lower order adder stages to produce the carry look-ahead at the desired adder stage. As will be appreciated by those skilled in the art, the required logic equations are established through the application of boolean algebra techniques.

Figure 4:
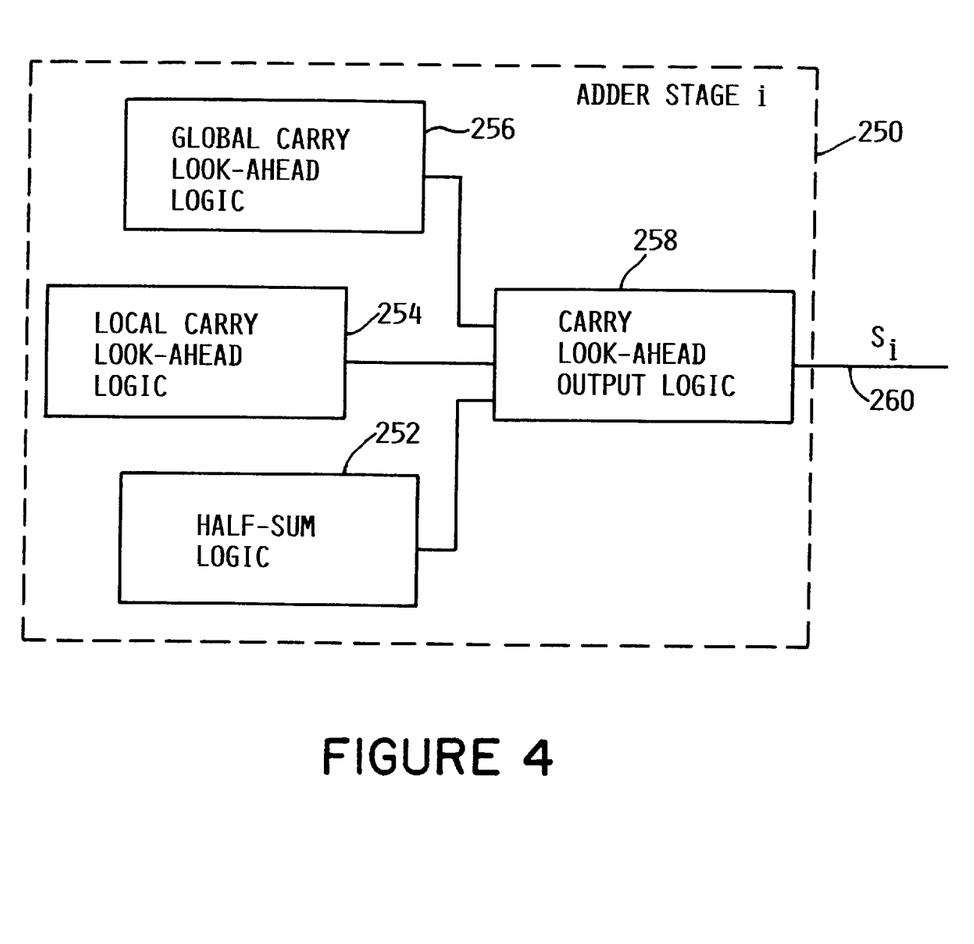
FIG. 4 is a block diagram of the adder segments required to generate a sum bit $s_i$ at an adder stage i.

Referring now to FIG. 4, a block diagram of the adder segments required to generate a sum bit $s_i$ at an adder stage i 250 is shown. The half-sum logic 252 adds same-order bits to produce a half-sum bit. The local carry look-ahead logic 254 is used to generate look-ahead carry bits for higher order adder stages within the same adder group. The global carry look-ahead logic 256 generates look-ahead carry bits for higher order adder stages from lower order adder groups. The carry look-ahead output logic 258 receives the half-sum, the local carry look-ahead, and the global carry look-ahead bits to produce the sum $s_i$ on line 260 at adder stage i 250.

Figure 5:
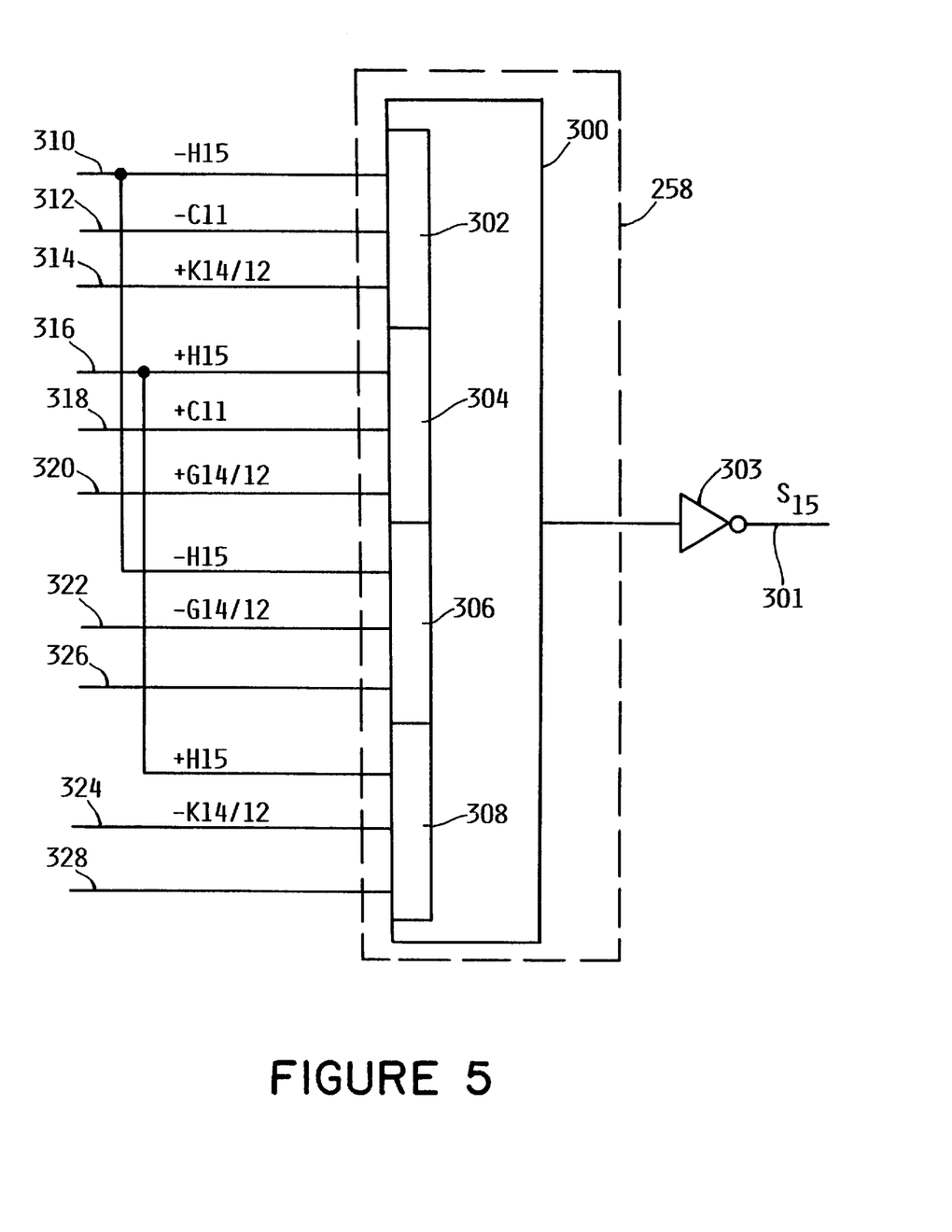
FIG. 5 illustrates the inputs required for the carry look-ahead output logic for the adder stage which generates sum bit $s_{15}$ in the preferred embodiment.

FIG. 5 illustrates the inputs required for the carry look-ahead output logic 258 for adder stage 200 which generates sum bit $s_{15}$ in the preferred embodiment. Boolean equations derived by expanding the carry term for each adder stage i, taking into consideration the local and global carry paths, dictates the logic circuitry required. The carry look-ahead circuitry for the most significant sum bit $s_{15}$ is described in connection with FIG. 5 in order to describe the scenario having the most carries for a 16-bit adder. However, as will be appreciated by those skilled in the art, similar logic functions can be constructed for the remaining lower order sum bits according to the boolean equations derived.

Referring to FIG. 5, the carry look-ahead output logic 258 of FIG. 4 is shown. The derived boolean equation dictates that a 3×4 OR-AND-INVERT circuit 300 be used to generate sum bit $s_{15}$ on line 301. Inverter 303 is used to again invert the signal to essentially make circuit 300 work as an OR-AND circuit, which was required for the boolean equations of the preferred embodiment. Circuit 300 is actually the sum circuit to generate the final sum for the particular sum bit, which is sum bit $s_{15}$ in FIG. 5. Circuit 300 generates the sum bit in the manner as described in connection with FIG. 11.

Four 3-bit inputs are shown as input 302, 304, 306 and 308. Input 302 receives logic signal –H15 on line 310, which represents an inverted half-sum of bits $a_{15}$ and $b_{15}$. Logic signal –C11 on line 312 represents the inverted global carry from the lower order adder groups, beginning at adder stage 216 to the least significant carry bit at adder stage 238. Logic signal +K14/12 on line 314 represents the local carry from adder stages 202, 204 and 206, which respectively correspond to sum bits $s_{14}$, $s_{13}$ and $s_{12}$.

Similarly, input 304 receives logic signals +H15 on line 316, +C11 on line 318, and +G14/12 on line 320. The logic signal +H15 is the inverted –H15 signal from line 310, and the +C11 logic signal on line 318 is the inverted –C11 logic signal from line 312. The +G14/12 logic signal on line 320 represents local carries, and is described in more detail below. The next input 306 receives logic signals –H15 on line 310, and –G14/12 on line 322. Finally, input 308 receives logic signals +H15 on line 316 and –K14/12 on line 324. For the present example, no signals are required at inputs 306 and 308 on lines 326 and 328 respectively in the 3×4 OR-AND circuit 300. The generation of each of these signals will be shown in the following description.

Figure 6:
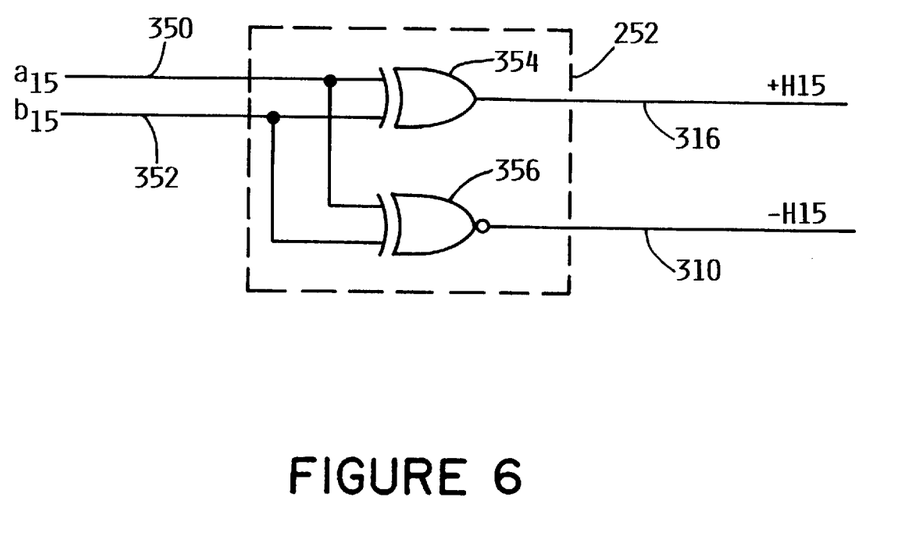
FIG. 6 is a diagram of the half-sum logic in one embodiment of the invention.

Referring now to FIG. 6, a diagram of the half-sum logic 252 for bits $a_{15}$ and $b_{15}$ is shown. Bits $a_{15}$ and $b_{15}$ on lines 350 and 352 are inputs to exclusive-OR 354, which generates the half-sum bit +H15 on line 316, as previously shown in FIG. 5. Half-sum bit –H15 on line 310 is generated using an exclusive-NOR 356, which produces an inverted +H15 half-sum bit. Half-sum bit +H15 is connected to inputs 304 and 308, and half-sum bit –H15 is connected to inputs 302 and 306 as shown in FIG. 5. The exclusive-OR 354 and the exclusive-NOR 356 function as half-adders that generate a sum of two 1-bit operands, and disregard any carry bits. The carry bits are generated by the local carry look-ahead logic 254, and the global carry look-ahead logic 256.

Figure 7:
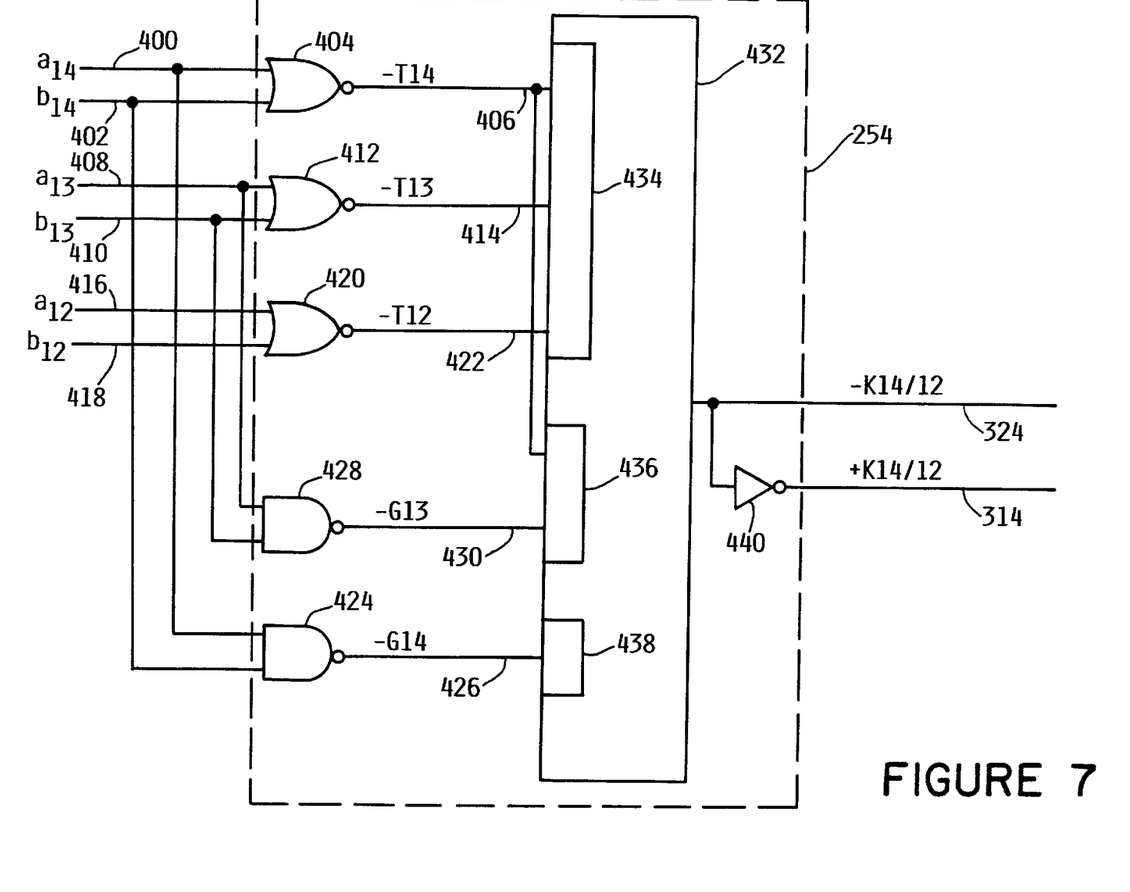
FIG. 7 is a block diagram of the local carry look-ahead logic for one embodiment of the invention.

FIG. 7 is a block diagram of the local carry look-ahead logic 254 for adder stage 200. Dictated by the derived boolean equations, bits $a_{14}$ and $b_{14}$ on lines 400 and 402 are inputs to NOR gate 404, which generates the transmit signal –T14 on line 406. Bits $a_{13}$ and $b_{13}$ on lines 408 and 410 are inputs to NOR gate 412, which generates the transmit signal –T13 on line 414. Bits $a_{12}$ and $b_{12}$ on lines 416 and 418 are inputs to NOR gate 420, which generates the transmit signal –T12 on line 422. Bits $a_{14}$ and $b_{14}$ on lines 400 and 402 are also inputs to NAND gate 424, that generates the generate signal –G14 on line 426. Bits $a_{13}$ and $b_{13}$ on lines 408 and 410 are also inputs to NAND gate 428, which generates the generate signal –G13 on line 430.

These transmit and generate signals become the inputs to another level of boolean logic shown as 3×3 OR-AND-INVERT circuit 432, that indicates that three 3-bit inputs are available. The first of these inputs is input 434, which receives signals –T14, –T13 and –T12 on lines 406, 414 and 422 respectively. Input 436 receives signals –T14 and –G13 on lines 406 and 430 respectively. Input 438 receives signal –G14 on line 426. The unused available inputs are set to a logic level which allows the inputs that are utilized to activate the gate. For instance, unused inputs to an OR gate would be tied to a low logic level so that an active high logic signal at an input being used will cause the output of the OR gate to output a high logic signal.

The OR-AND-INVERT circuit 432, which is described in more detail below, generates the –K14/12 signal on line 324 as seen in FIGS. 5 and 7. The +K14/12 signal on line 314 is created by inverting the –K14/12 signal from line 324 with inverter 440. The –K14/12 and +K14/12 signals on lines 324 and 314 become inputs to the carry look-ahead output logic 258 of FIGS. 4 and 5. A summary of the equations for generating signal –K14/12 is shown below in Table 1. Signal +K14/12 is simply the logical inversion of the –K14/12 signal.

TABLE 1

| SIGNAL | EQUATION |
|---|---|
| –T14 | $NOT(a_{14} + b_{14})$ |
| –T13 | $NOT(a_{13} + b_{13})$ |
| –T12 | $NOT(a_{12} + b_{12})$ |
| –G13 | $NOT(a_{13} \cdot b_{13})$ |

TABLE 1-continued

| SIGNAL | EQUATION |
| --- | --- |
| −G14 | NOT($a_{14} \cdot b_{14}$) |
| −K14/12 | NOT((−T14) + (−T13) + (−T12)) + NOT((−T14) + (−G13)) + NOT (−G14) |

A similar circuit to that of FIG. 7 is used to generate the +G14/12 and −G14/12 signals on lines 320 and 322 respectively. A summary of the equations for generating signal +G14/12 is shown below in Table 2. Signal −G14/12 is simply the logical inversion of the +G14/12 signal.

TABLE 2

| SIGNAL | EQUATION |
| --- | --- |
| −T14 | NOT($a_{14} + b_{14}$) |
| −T13 | NOT($a_{13} + b_{13}$) |
| −G12 | NOT($a_{12} \cdot b_{12}$) |
| −G13 | NOT($a_{13} \cdot b_{13}$) |
| −G14 | NOT($a_{14} \cdot b_{14}$) |
| +G14/12 | NOT((−T14) + (−T13) + (−G12)) + NOT((−T14) + (−G13)) + NOT(−G14) |

As will be appreciated by those skilled in the art, where sum bit $s_{14}$ is being calculated rather than sum bit $s_{15}$, only local carries from adder stages 204 and 206 are necessary. This would result in signals −K13/12, +K13/12, −G13/12 and +G13/12, the generation of which is analogous to the generation of the signals in Tables 1 and 2.

Figure 8:
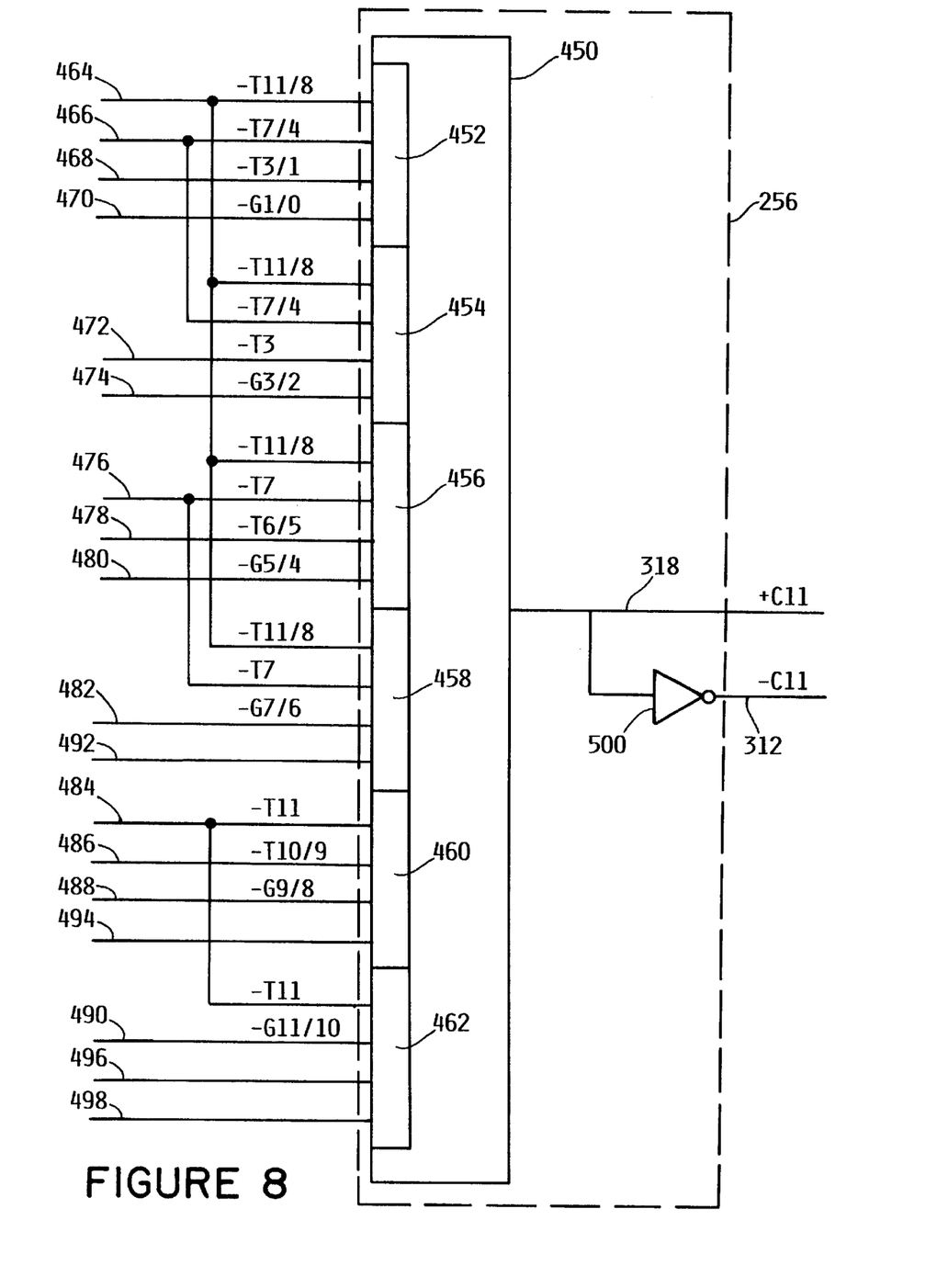
FIG. 8 is a block diagram of the global carry look-ahead logic for one embodiment of the invention.

Referring now to FIG. 8, a block diagram of the global carry look-ahead logic 256 for adder stage 200 is shown. The logic signals required to generate the +C11 and −C11 global carry bits for adder stage 200 are shown as inputs to the global carry look-ahead logic 256. The global carry bits that need to be generated for sum bit $s_{15}$ are the +C11 and −C11 global carry bits on lines 318 and 312 respectively, which are generated from the lower order adder groups shown in FIG. 3 as adder group0 214, adder group1 212 and adder group2 210.

FIG. 8 includes OR-AND-INVERT circuit 450 having inputs 452, 454, 456, 458, 460 and 462. Input 452 receives signal −T11/8 on line 464, signal −T7/4 on line 466, signal −T3/1 on line 468, and signal −G1/0 on line 470. Input 454 receives signal −T11/8 on line 464, signal −T7/4 on line 466, signal −T3 on line 472, and signal −G3/2 on line 474. Input 456 receives signal −T11/8 on line 464, signal −T7 on line 476, signal −T6/5 on line 478, and signal −G5/4 on line 480. Input 458 receives signal −T11/8 on line 464, signal −T7 on line 476, and signal −G7/6 on line 482. Input 460 receives signal −T11 on line 484, signal −T10/9 on line 486, and signal −G9/8 on line 488. Input 462 receives signal −T11 on line 484, and signal −G11/10 on line 490. Input lines 492, 494, 496 and 498 are unused. The unused available input lines are set to a logic level which allows the inputs that are utilized to activate the gate. The OR-AND-INVERT circuit 450 generates a global carry bit +C11 on line 318. Global carry bit −C11 on line 312 is generated by inverting the +C11 signal on line 318 with inverter 500.

Boolean logic circuitry is used to generate the input signals to OR-AND-INVERT circuit 450. The generation of boolean logic from boolean equations is known in the art. The boolean equations necessary to generate the input signals to the OR-AND-INVERT circuit 450 for adder stage 200 are shown in Table 3 below. It should be noted that similar logic functions can be implemented for global carry bits associated with lower order adder stages.

TABLE 3

| SIGNAL | EQUATION |
| --- | --- |
| −T11/8 | NOT($(a_{11} + b_{11}) \cdot (a_{10} + b_{10}) \cdot (a_9 + b_9) \cdot (a_8 + b_8)$) |
| −T7/4 | NOT($(a_7 + b_7) \cdot (a_6 + b_6) \cdot (a_5 + b_5) \cdot (a_4 + b_4)$) |
| −T3/1 | NOT($(a_3 + b_3) \cdot (a_2 + b_2) \cdot (a_1 + b_1)$) |
| −G1/0 | NOT($(a_1 \cdot b_1) + (a_0 \cdot b_0)$) |
| −T3 | NOT($a_3 + b_3$) |
| −G3/2 | NOT($(a_3 \cdot b_3) + (a_2 \cdot b_2)$) |
| −T7 | NOT($a_7 + b_7$) |
| −T6/5 | NOT($(a_6 + b_6) \cdot (a_5 + b_5)$) |
| −G5/4 | NOT($(a_5 \cdot b_5) + (a_4 \cdot b_4)$) |
| −G7/6 | NOT($(a_7 \cdot b_7) + (a_6 \cdot b_6)$) |
| −T11 | NOT($a_{11} + b_{11}$) |
| −T10/9 | NOT($(a_{10} + b_{10}) \cdot (a_9 + b_9)$) |
| −G9/8 | NOT($(a_9 \cdot b_9) + (a_8 \cdot b_8)$) |
| −G11/10 | NOT($(a_{11} \cdot b_{11}) + (a_{10} \cdot b_{10})$) |
| +C11 | NOT((−T11/8) + (−T7/4) + (−T3/1) + (−G1/0)) + NOT((−T11/8) + (−T7/4) + (−T3) + (−G3/2)) + NOT((−T11/8) + (−T7) + (−T6/5) + (−G5/4)) + NOT((−T11/8) + (−T7) + (−G7/6)) + NOT((−T11) + (−T10/9) + (−G9/8)) + NOT((−T11) + (−G11/10)) |

In the preferred embodiment, the previously described local carry look-ahead logic 254, global carry look-ahead logic 256, and carry look-ahead output logic 258 utilize novel circuitry for performing the boolean functions of the adder. For instance, the signals −T11/8, −T7/4, and −T3/1 from Table 3 require these novel circuits in the preferred embodiment due to improve the timing performance, while the other signals could be implemented with ordinary CMOS circuitry. These novel circuits make extensive use of a low voltage, multi-emitter, bipolar complementary metal oxide semiconductor (BICMOS). A very low input capacitance is obtained where BICMOS technology is designed into the adder in the carry tree and sum outputs. The carry tree and sum outputs of preferred adder has approximately 0.01 picofarad of input capacitance, which is on the order of 1/10 of the capacitance of standard-gate adder designs.

Figure 9:
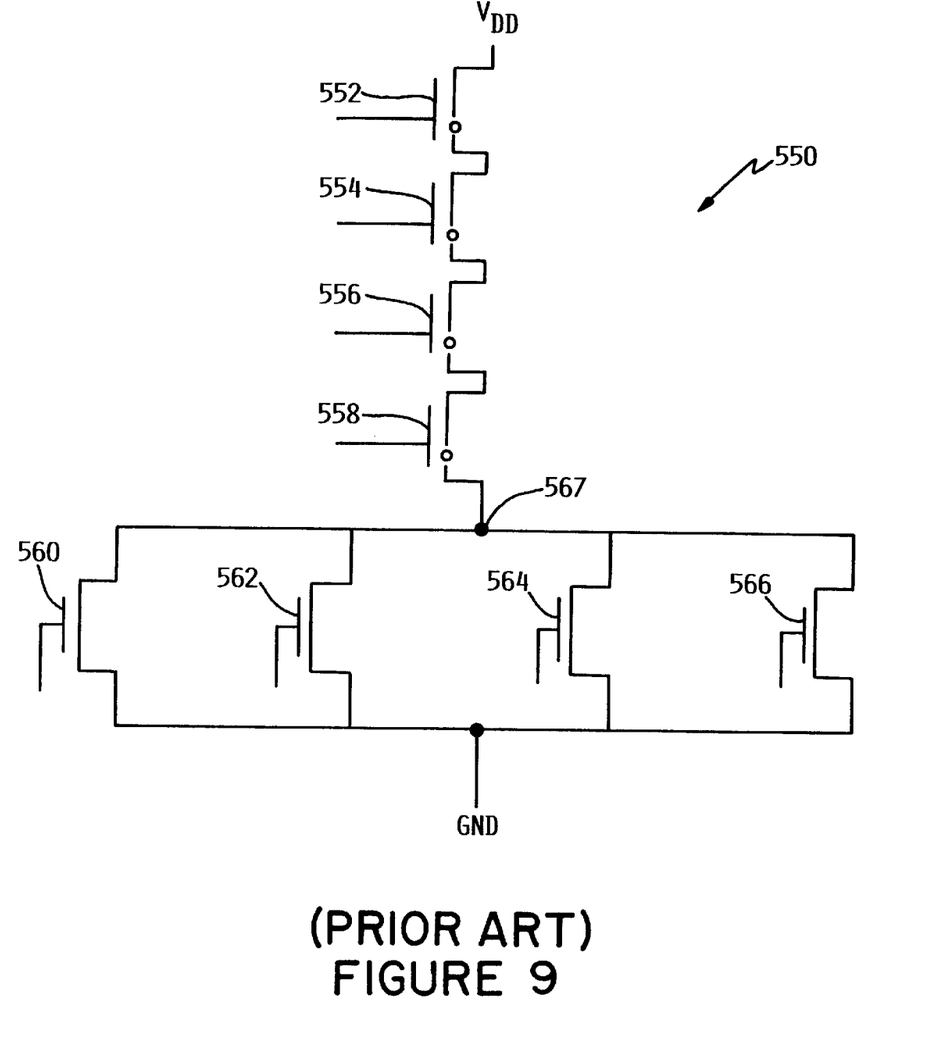
FIG. 9 is a diagram of a traditional complementary metal oxide semiconductor (CMOS) NOR gate.

FIG. 9 is a diagram of a traditional complementary metal oxide semiconductor (CMOS) NOR gate 550. The p-channel field effect transistors (PFETs) 552, 554, 556 and 558 are relatively large PFET pull-up devices which are required where the n-channel field effect devices (NFETs) 560, 562, 564 and 566 are relatively large.

As will be appreciated by those skilled in the art, due to the DC current path from VDD to ground in the circuit of FIG. 9, the voltage at an output node 567 will not be at ground. Also, because the NFETs of FIG. 9 are large, the DC power consumption will be much greater than the BI-CMOS circuit that will be discussed in connection with FIG. 10. For the circuit of FIG. 10, only one NFET is required because of the addition of the bipolar device. The circuit of FIG. 10 is therefore smaller, consumes less power, and is faster than the circuit of FIG. 9.

Figure 10:
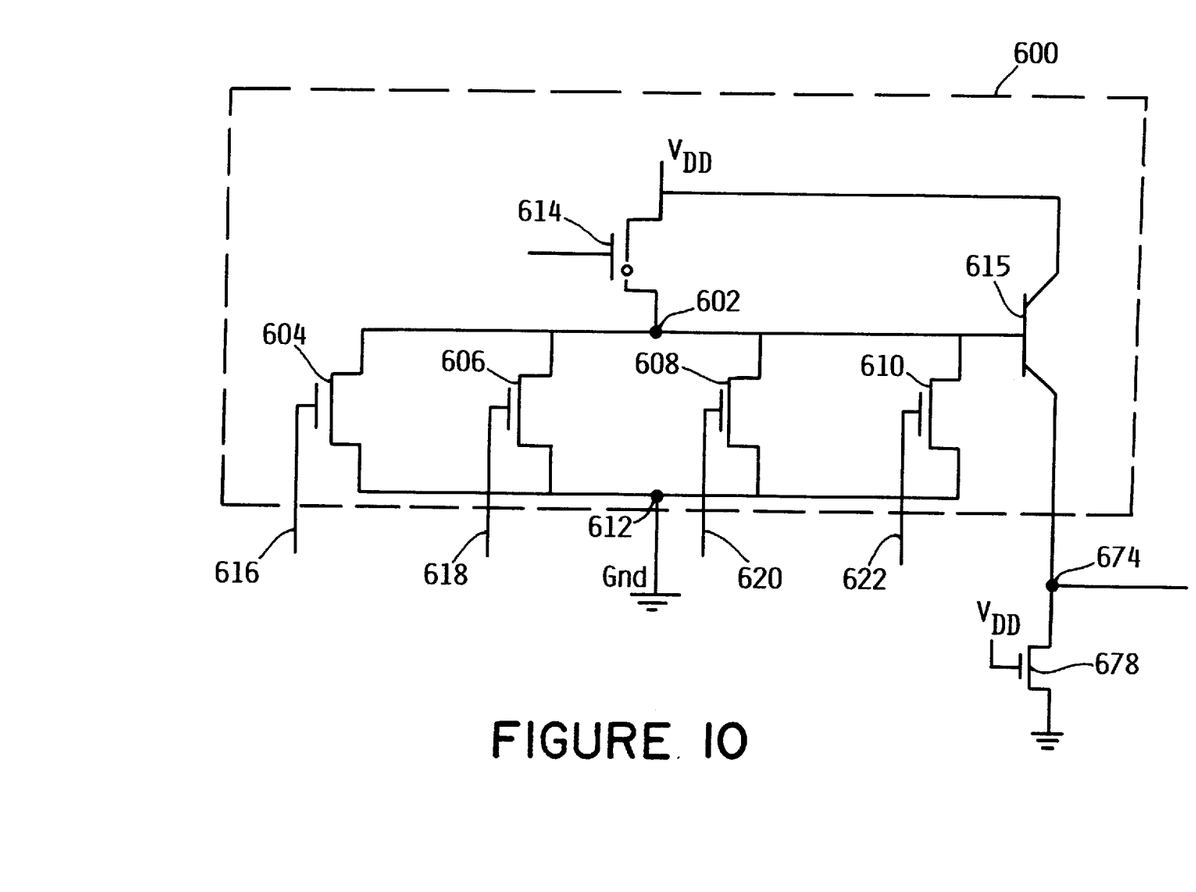
FIG. 10, a diagram of a complementary metal oxide semiconductor (CMOS) NOR gate as implemented in the present invention.

Referring now to FIG. 10, a diagram of a complementary metal oxide semiconductor (CMOS) NOR gate of the present invention, labeled logic array 600, is shown. Logic array 600 includes a first node 602 where the drain terminals of each of the NFET devices 604, 606, 608 and 610 are connected together. The source terminals of each NFET are coupled together at a second node 612 which is connected to a voltage reference, shown as a ground reference "Gnd". Pull-up device 614 is coupled between the first node 602 and the supply voltage VDD. When all of the signals at the gate terminals of NFETs 604, 606, 608 and 610 are at a low logic level, the NFETs will be in an "off" state, and no drain-tosource current will flow through the NFETs. Pull-up device 614 pulls the voltage at the first node 602 to a voltage approximately equal to the supply voltage VDD. A logic high signal on any of the gate terminals of NFETs 604, 606, 608 and 610 cause drain-to-source current to flow through the respective NFETs, thereby causing the voltage at the first node 602 to drop to a low logic level. As will be appreciated by those skilled in the art, the logic array 600 may be described in terms of an active high input NOR gate, or alternatively as an active low input AND gate in accordance with DeMorgan's Theorem. Node 602 is coupled to the base of the bipolar device 615. A bipolar device allows for smaller PFETS because the bipolar device provides a current gain according to the particular beta value of the device. For example, where bipolar device 615 has a beta of 100, a 1 ma base current will provide a 100 ma emitter current to the output at node 674. This provides the gain required to drive the load quickly, without having to have large FET devices as in FIG. 9. Where node 567 of FIG. 9 is the actual output node, there is no current gain, and the FET devices 560–566 and 552–558 will be much larger than what is required in the BI-CMOS circuit of FIG. 10. This reduction in FET size decreases capacitive effects, and allows for a much faster circuit, ultimately increasing the speed of the adder. The NFETs and the bipolar device 615 therefore act as a boolean NOR function. As was shown in Table 3 and FIG. 8, the inputs to the 4×6 circuit are active low signals, and the logic level at the first node 602 will be a high logic level when the input signals on input lines 616, 618, 620 and 622 are all at a low logic level. NFET 678 is a pull-down device that connects the output to ground, and is essentially an emitter follower to ensure that the bipolar device 615 is sufficiently pulled to a low logic level. In one embodiment of the invention, the pull-down NFET 678 operates in the triode region which, as will be appreciated by those skilled in the art, acts as a resistance.

Figure 11A:
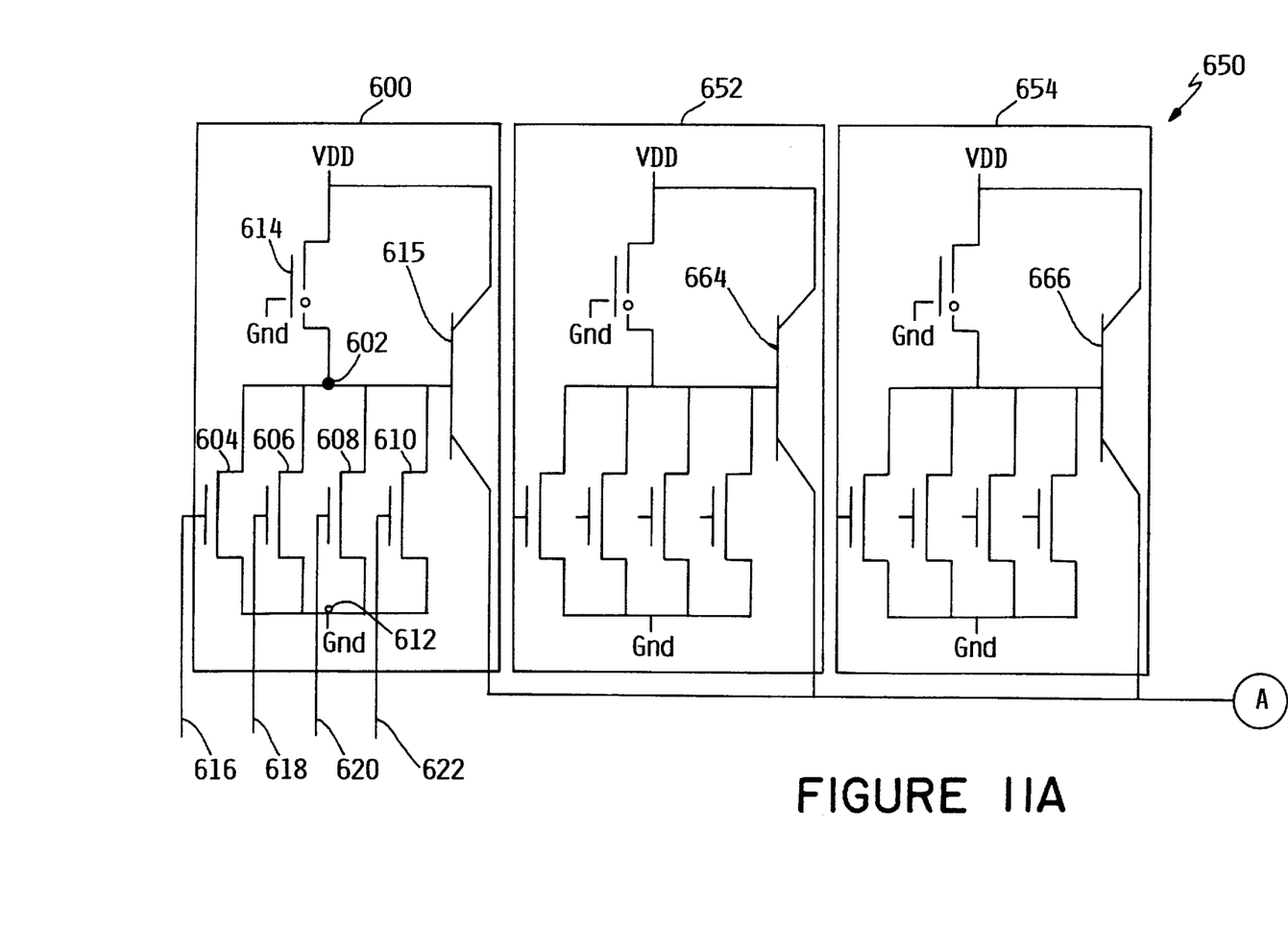
FIGS. 11A and 11B, is a schematic diagram of a 4×6 low voltage, multi-emitter, BICMOS circuit as implemented in the present invention.
Figure 11B:
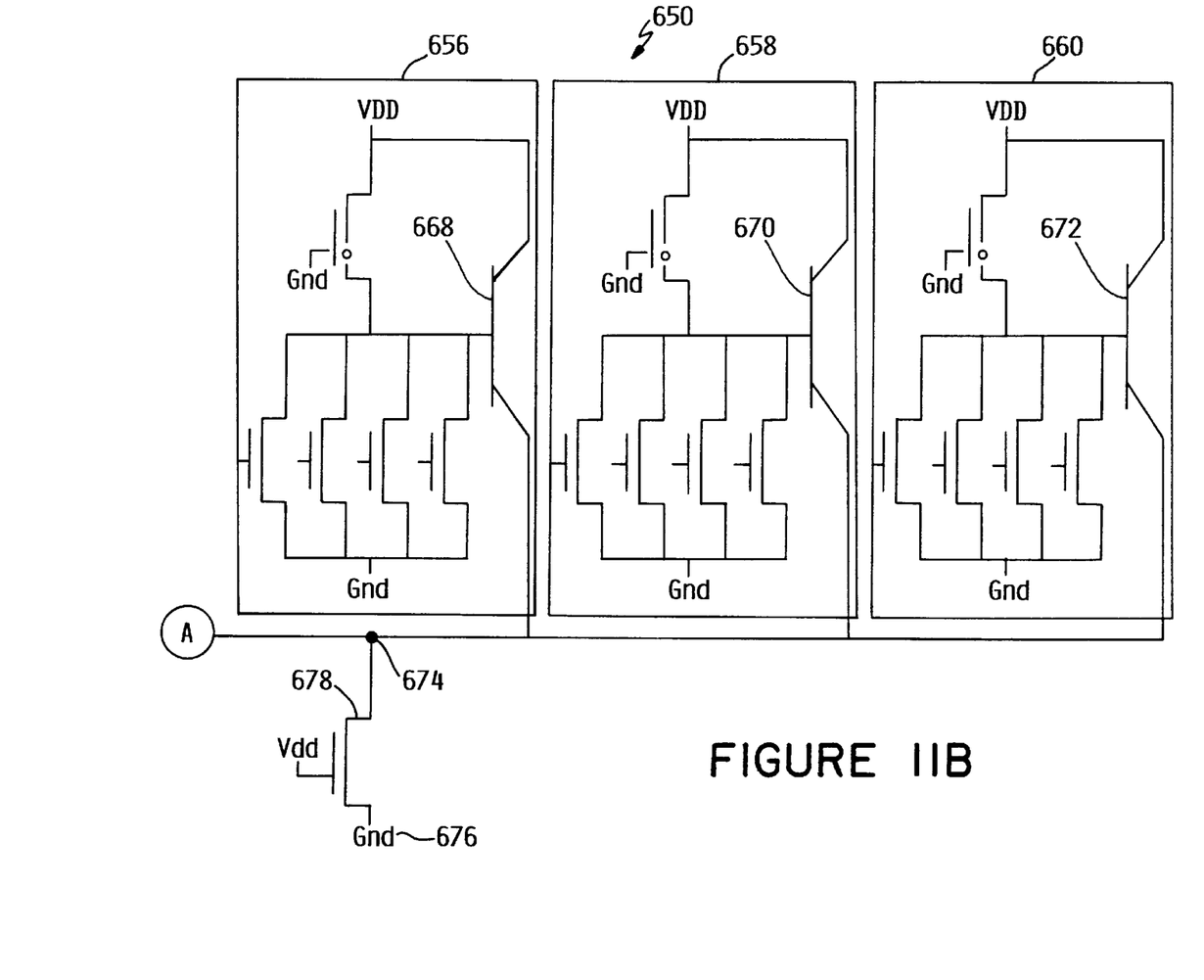

Referring now to FIG. 11, including FIGS. 11A and 11B, a schematic diagram of a 4×6 low voltage, multi-emitter, BICMOS circuit 650 is shown. Logic array 600 of FIG. 10 is shown together with five other similar logic arrays labeled logic arrays 652, 654, 656, 658 and 660. There are four inputs for each of the six logic arrays, thus circuit 650 is referred to as a 4×6 circuit. Different circuit sizes exist in the carry look-ahead circuits 254, 256 and 258 of FIG. 4, including 2×2, 2×4, 3×3 and 4×5 circuits. The operating principles described in connection with the 4×6 circuit 650 of FIG. 11 are also applicable to the other BICMOS circuits designed into the carry look-ahead circuits.

Bipolar devices 662, 664, 666, 668, 670 and 672 are connected in parallel between the supply voltage VDD and an output node 674. The bipolar devices each have their collector terminals connected to the supply voltage VDD, and their emitter terminals connected together at the output node 674 which is coupled to the ground reference 676 through the pull-down device 678. The parallel bipolar devices being coupled between the supply voltage VDD and the pull-down device 678 essentially creates a parallel structure of emitter followers. The emitter followers are characterized by relatively high input impedance and low output impedance. The emitters are dotted together, creating an OR logic function. Even where there is multiple emitter-dotting, the capacitance at the emitter is very small, and the extra functionality is obtained without any significant increase in the delay of the circuits. Therefore, large complex functions can be obtained in one level of delay, where a straight CMOS circuit might require multiple levels of logic gates to produce the same output, thereby increasing the time and decreasing the speed of the adder. Furthermore, the NFET devices in each of the logic arrays 600, 652, 654, 656, 658 and 660 can be made relatively small due to the high input impedance of the connected bipolar devices 662, 664, 666, 668, 670 and 672. These small NFET devices allow for the small capacitance at the bases of the bipolar devices. This small capacitance, and the logic function provided by dotting the emitters of the bipolar devices results in an adder having a low voltage, multi-emitter BICMOS circuit of unmatched speed.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the following claims.

What is claimed is:

1. A carry look-ahead circuit for use in generating carry bits in an n-bit parallel static adder, the adder having n adder stages ranging from a lowest order to add the least significant addend and augend bits, to a highest order to add the most significant addend and augend bits, wherein the adder thereby generates sums of like-order addend, augend, and carry bits, the carry look-ahead circuit comprising:

a plurality of logic arrays, each comprising one or more field effect devices coupled in parallel between a first node and a second node, each of the one or more field effect devices having a gate input to receive addend and augend bits from lower order adder stages in accordance with a predetermined sum-of-products carry look-ahead equation;

a plurality of bipolar devices, coupled in parallel between a supply voltage and an output node, each having a base terminal coupled to one of the first nodes of the plurality of field effect devices to provide a sum term of the predetermined sum-of-products carry look-ahead equation at the output node.

2. The carry look-ahead circuit of claim 1, wherein the bipolar devices are coupled at their emitter terminals to provide an emitter-dot configuration at the output node.

3. The carry look-ahead circuit of claim 1, further comprising a pull-down device coupled between the output node and a reference voltage.

4. The carry look-ahead circuit of claim 3, wherein the pull-down device comprises a field effect transistor operating in a triode region of operation.

5. The carry look-ahead circuit of claim 1, further comprising a plurality of pull-up devices, each one coupled between one of the first nodes and the supply voltage.

6. The carry look-ahead circuit of claim 5, wherein each of the plurality of pull-up devices comprise a field effect transistor operating in a triode region of operation.

7. The carry look-ahead circuit of claim 1, further including inverters at the gate inputs and the output node for effecting a DeMorgan's equivalent of the predetermined sum-of-products carry look-ahead equation to provide a product-of-sums at the output node.

8. A parallel static adder for adding two n-bit operands each having a least significant bit and a most significant bit, comprising:

a plurality of half-sum means, each for receiving a pair of same-order bits from the two n-bit operands, and for generating a plurality of half-sum signals for each of the pairs of same-order bits;

a plurality of summing means, each coupled to one of the half-sum means to receive a corresponding one of the half-sum signals, for adding the corresponding half-sum signal to a carry signal from a preceding lower order summing means;

a plurality of carry look-ahead means each coupled to a different one of the summing means for generating the carry signal for a succeeding higher order summing means, each of the carry look-ahead means comprising:

a plurality of logic arrays, each comprising one or more field effect devices coupled in parallel between a first node and a second node, each of the field effect devices having a gate input to receive lower order addend and augend bits in accordance with a predetermined sum-of-products carry look-ahead equation;

a plurality of bipolar devices, coupled in parallel between a supply voltage and an output node, each having a base terminal coupled to one of the first nodes of the plurality of field effect devices to provide a sum term of the predetermined sum-of-products carry look-ahead equation at the output node.

9. The parallel static adder of claim 8, wherein the carry look-ahead means comprises local carry look-ahead means and global carry look-ahead means.

10. The parallel static adder of claim 9, wherein the local carry look-ahead means comprises means for calculating a local carry look-ahead signal for immediately preceding bits within the same data nibble.

11. The parallel static adder of claim 9, wherein the global carry look-ahead means comprises means for calculating a global carry look-ahead signal for lower order data nibbles.

12. The parallel static adder of claim 8, wherein the predetermined carry look-ahead equation is realized in four levels of logic.

13. The carry look-ahead circuit of claim 8, further comprising a pull-down device coupled between the output node and a reference voltage.

14. The carry look-ahead circuit of claim 13, wherein the pull-down device comprises a field effect transistor operating in a triode region of operation.

15. The carry look-ahead circuit of claim 8, further comprising a plurality of pull-up devices, each one coupled between one of the first nodes and the supply voltage.

16. The carry look-ahead circuit of claim 15, wherein each of the plurality of pull-up devices comprise a field effect transistor operating in a triode region of operation.

17. A carry look-ahead circuit for use in the prediction of carry bits in an n-order parallel static adder, having adder stages ranging from a low order to a high order adder stage to add like-order addend and augend bits, the carry look-ahead circuit comprising:

(a) a plurality of AND arrays, each comprising one or more field effect devices coupled in parallel between a first node and a second node, each having a gate input to receive one of a lower order addend and augend corresponding to a product term in a predetermined sum-of-products carry look-ahead equation;

(b) a plurality of pull-up devices, each coupled between the first node of one of the plurality of AND arrays and a supply voltage;

(c) a plurality of bipolar devices, coupled in parallel between the supply voltage and an output node, each having a base terminal coupled to one of the first nodes of the plurality of field effect devices to provide a sum term of the predetermined sum-of-products carry look-ahead equation at the output node; and (d) a pull-down device coupled between the output node and the reference voltage, wherein the plurality of bipolar devices are thereby in a wired-OR configuration at the output node.

18. The carry look-ahead circuit of claim 17, further including inversion means for converting the predetermined sum-of-products into a predetermined product-of-sums.

* * * * *